Sept. 4, 1962
E. T. SHERWOOD ET AL
3,052,818
LOW TENSION IGNITION SYSTEM
Filed Nov. 28, 1955
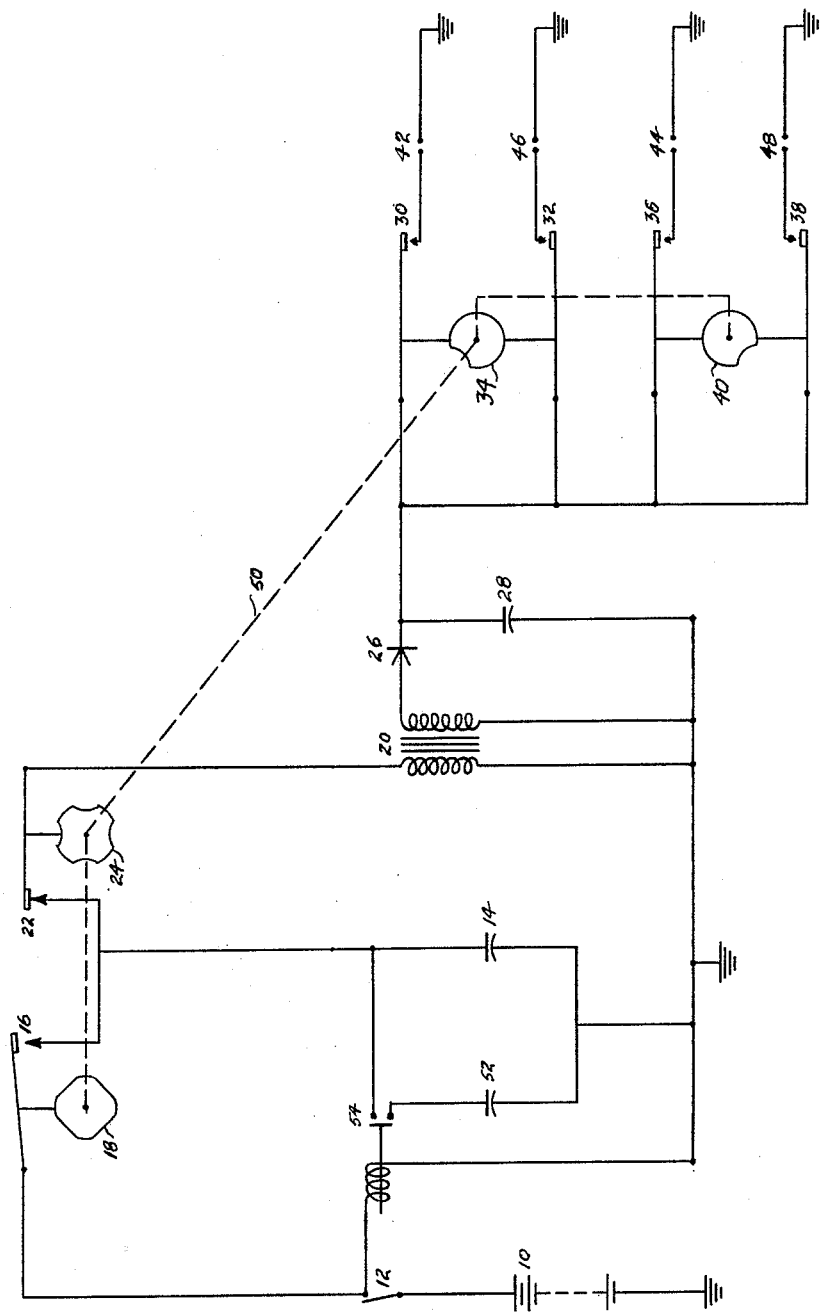
INVENTORS
Edwin T. Sherwood
Robert Schimek
by John W. Michael
Attorney

3,052,818
LOW TENSION IGNITION SYSTEM
Edwin T. Sherwood, Bayside, and Robert Schimek, Milwaukee, Wis., assignors to Globe-Union Inc., Milwaukee, Wis., a corporation of Delaware
Filed Nov. 28, 1955, Ser. No. 549,249
4 Claims. (Cl. 315—209)

This invention relates to improvements in ignition systems, particularly to such systems including low tension spark plugs wherein the gap is under .010 inch and the energy delivered is in the neighborhood of 115 millijoules.

In such systems a pulse amplifying transformer charges a storage capacitor in the secondary circuit which is then discharged to the plug. When the motor is operating at a constant speed, the energy input produced from a storage battery can be adequately balanced to the required energy output without undue overheating and consequent energy losses. This condition will be called balanced energy speed. When such system is used with a motor which must operate at wide variations in the speed, there will be too much energy drawn from the battery at speeds lower than the balanced energy speed, and not enough energy available at speeds higher than the balanced energy speed. At the lower speeds there will be overheating with consequent loss of energy. At the higher speeds there will be sparking failure.

One object of this invention, therefore, is to provide a low tension ignition system which will operate economically at all engine speeds and eliminate the foregoing disadvantages.

Another object of this invention is to provide a low tension ignition system in which the voltage wave front at the spark gap is extremely steep so that the maximum energy is discharged in the minimum time to produce maximum heat for a given amount of energy.

To accomplish these objects the system has a 24-volt storage battery which successively charges a non-polarized, low power factor metering capacitor. The charge on this metering capacitor is then placed on the primary of a pulse amplifying transformer. Such amplified pulse, made unidirectional by a selenium rectifier, charges a storage capacitor. This capacitor delivers its charge to the low tension spark plugs under control of a distributor. The metering capacitor absorbs only that amount of energy which is required at the plugs for proper operation. When the engine is operating at low speeds with longer drain period on the battery, no energy beyond that acceptable by the metering capacitor will be withdrawn from the battery. Hence there will be no overheating and loss of energy. The storage capacitor dumps its energy in a steep wave and this produces a spark with maximum heat in the minimum of time.

This invention will be best understood from the following description of a specific embodiment when read in connection with the accompanying schematic diagram of an ignition system embodying such invention.

In the embodiment shown the initial source of power is provided by a storage battery 10 having a range of 18 to 28 volts and generally designed as 24-volt. The negative terminal of this battery is connected to ground and the positive terminal to an ignition switch 12. When the ignition switch 12 is closed, a metering capacitor 14 is connected in series with the battery 10 by breaker points 16 operated by a cam 18. The metering capacitor 14 has a capacity of 1000 microfarads and is rated for 50 volts. It is preferably non-polarizing and should have a low power factor, say, in the neighborhood of 12%. The metering capacitor 14 is connected in series with the primary coil of a pulse amplifying transformer 20 by breaker points 22 operated by a cam 24. The cam 18 has peaks angularly aligned with valley in the cam 24 so that when cam 18 closes breaker points 16, the cam 24 will open breaker points 22.

The amplified pulse in the secondary of the transformer 20 is connected in series with a selenium rectifier 26 of standard design and a storage capacitor 28. The storage capacitor 28 has a capacitance of 0.15 microfarad and a test voltage of 1500.

The storage capacitor 28 is alternately connected to plugs 42, 46, 44 and 48 by a distributor represented by a cam 34 operating the breaker points 30 and 32 and a cam 40 operating the breaker points 36 and 38. A camshaft illustrated by the broken line 50 operates the cams at one-half engine speed. As shown in the drawing, the cam 34 has a single valley aligned with the peak of cam 24 and cam 40 has its single valley spaced angularly 90° counter-clockwise from the valley of cam 34. With the camshaft rotating clockwise and assuming that the storage capacitor 28 has just been charged from the transformer 20, the following sequence of operations takes place: at 45° breaker points 16 close and breaker points 22 open to charge the metering capacitor 14 to its full capacity and breaker points 30 close and the charge in the storage capacitor 28 then discharges through the plug 42; at 90° breaker points 16 open and breaker points 22 close charging the storage capacitor 28 from the metering capacitor 14 through the amplifying transformer 20; at 135° breaker points 16 close and breaker points 22 open to again charge the metering capacitor 14, and breaker points 36 close to discharge the storage capacitor 28 through the plug 44; at 180° breaker points 16 open and breaker points 22 close to charge the storage capacitor 28 from the metering capacitor 14; at 225° breaker points 16 close and breaker points 22 open to charge the metering capacitor 14, and breaker points 32 close to discharge the storage capacitor 28 through the plug 46; at 270° breaker points 16 open and breaker points 22 close to charge the storage capacitor 28 from the metering capacitor 14; at 315° breaker points 16 close and breaker points 22 open to charge the metering capacitor 14, and breaker points 38 close to discharge the storage capacitor 28 through the plug 48; at 360° breaker points 16 open and breaker points 22 close to charge the storage capacitor 28, and the system is again in the position shown in the drawing.

The primary advantage of this system is the conservation of energy by the interposition of the metering capacitor 14 in the primary circuit of the pulse amplifying transformer. The metering capacitor 14 is rapidly charged to its full capacity. This capacity is set to produce the required energy at the spark plug. If the engine speed decreases so that the dwell time increases, there will not be any increased drain on the battery because no more energy can be absorbed by such metering capacitor. This avoids overheating of the transformer and loss of energy.

Since the battery 10 has a workable range of 18 to 28 volts, it might be desirable in installations requiring close specifications to include in the primary circuit a second metering capacitor 52. This capacitor has a capacitance of 500 microfarads with a 50-volt limit. It is held out of parallel with the metering capacitor 14 by a low voltage relay 56 operating contacts 54. At any time that the voltage in the battery 10 is below a range of 22 to 24 volts the relay 56 will no longer hold the contacts 54 open and they will close to connect the second metering capacitor 52 in parallel with the metering capacitor 14 thus providing a total capacitance of 1500 microfarads. This insures that the energy available at the spark plugs will not drop below the stated requirement of in the neighborhood of 115 millijoules.

We claim:
1. In an electrical ignition system for internal combustion engines including in the spark plug circuit a storage capacitor energized from the secondary winding of a pulse amplifying transformer, a pulse amplifying transformer, a circuit for the primary of said transformer including a metering capacitor, a storage battery, means for periodically charging said metering capacitor from said battery while disconnected from said primary winding, means for periodically discharging said capacitor through said primary winding while disconnected from said battery, said metering capacitor being capable of absorbing only that amount of energy which is required of the spark plug circuit for proper operation, a second metering capacitor, and voltage responsive means for connecting said second capacitor in parallel with said first metering capacitor when the voltage in said battery drops below a fixed value.

2. In an ignition circuit for combustion engines, a storage battery, a metering capacitor connected to said battery by a charging circuit including first breaker points, a pulse amplifying transformer, a primary circuit including the primary of said pulse amplifying transformer said metering capacitor and second breaker points, means for opening and closing said first and second breaker points to first charge said metering capacitor from said battery while disconnected from said primary circuit and then discharge said metering capacitor to said transformer, a secondary circuit connected to the secondary of said pulse amplifying transformer and including a rectifier and a storage capacitor, a spark plug circuit connected with said storage capacitor by third breaker points, all said breaker points being coordinated so that said first breaker points are never closed when said second breaker points are closed and said second breaker points are never closed when said third breaker points are closed, said metering capacitor being capable of absorbing only that amount of energy which is required of the spark plug circuit for proper operation, a second metering capacitor, and voltage responsive means for connecting said second metering capacitor in parallel with said first metering capacitor when the voltage in said battery drops below a fixed value.

3. In an electrical ignition system including sets of breaker contacts driven in synchronism and electrically connected between a voltage source and a voltage multiplying device, the improvement comprising a voltage storing circuit electrically connected through one of said sets of breaker contacts with said voltage source so as to be charged by said source through said set when the latter is closed, said circuit being electrically connected through another set of said sets of breaker contacts with said voltage multiplying device to charge said device through said last named set when the latter is closed.

4. In an electrical ignition system including a voltage source and a voltage multiplying device, the improvement comprising first and second sets of breaker contacts electrically connected between said source and device, and a capacitative circuit electrically connected through one of said sets of breaker contacts with said voltage source to be charged by said source when said set is closed, said circuit being electrically connected through another set of said sets of breaker contacts with said voltage multiplying device to charge the latter when said other set is closed.

References Cited in the file of this patent
UNITED STATES PATENTS

| | | |
|---|---|---|
| 2,125,035 | Smits | July 26, 1938 |
| 2,146,977 | Nilsson | Feb. 14, 1939 |
| 2,311,270 | Vanderpoel | Feb. 16, 1943 |
| 2,544,477 | West | Mar. 6, 1951 |
| 2,589,164 | Tognola | Mar. 11, 1952 |
| 2,905,831 | Scott | Sept. 22, 1959 |